United States Patent
Numata et al.

(10) Patent No.: US 11,996,245 B2
(45) Date of Patent: May 28, 2024

(54) CERAMIC ELECTRONIC COMPONENT AND CIRCUIT BOARD

(71) Applicant: TAIYO YUDEN CO., LTD., Tokyo (JP)

(72) Inventors: Eriko Numata, Tokyo (JP); Daisuke Iwai, Tokyo (JP); Shinichi Sasaki, Tokyo (JP); Fumi Mori, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 103 days.

(21) Appl. No.: 17/886,976

(22) Filed: Aug. 12, 2022

(65) Prior Publication Data
US 2023/0104406 A1    Apr. 6, 2023

(30) Foreign Application Priority Data
Sep. 28, 2021  (JP) ................ 2021-157393

(51) Int. Cl.
| | |
|---|---|
| H01G 4/232 | (2006.01) |
| H01G 2/06 | (2006.01) |
| H01G 4/008 | (2006.01) |
| H01G 4/012 | (2006.01) |
| H01G 4/30 | (2006.01) |

(52) U.S. Cl.
CPC ........... *H01G 4/30* (2013.01); *H01G 2/065* (2013.01); *H01G 4/008* (2013.01); *H01G 4/012* (2013.01); *H01G 4/232* (2013.01)

(58) Field of Classification Search
None
See application file for complete search history.

(56) References Cited

U.S. PATENT DOCUMENTS

| | | | | |
|---|---|---|---|---|
| 5,963,416 | A * | 10/1999 | Honda | H01G 4/2325 29/25.42 |
| 9,685,272 | B2 * | 6/2017 | Ahn | H01G 4/30 |
| 11,557,434 | B2 * | 1/2023 | Kobayashi | H01G 4/30 |
| 2012/0188682 | A1 * | 7/2012 | Sato | H01G 4/232 336/200 |
| 2015/0243438 | A1 * | 8/2015 | Ahn | H01G 2/065 174/258 |

(Continued)

FOREIGN PATENT DOCUMENTS

| | | | |
|---|---|---|---|
| CN | 110289166 B | * 10/2020 | ............ H01G 2/065 |
| JP | 2000-49032 A | 2/2000 | |

*Primary Examiner* — Dion R. Ferguson
(74) *Attorney, Agent, or Firm* — Stein IP, LLC

(57) ABSTRACT

A ceramic electronic component includes: a ceramic body including main surfaces perpendicular to a first axis and end surfaces perpendicular to a second axis; and external electrodes covering the end surfaces and extending from the end surfaces to the main surfaces. The external electrode includes a surface layer portion including a Sn plating layer, and an inner layer portion including a Ni plating layer adjacent to the Sn plating layer and including rounded inner end portions on the main surfaces. In a cross-section perpendicular to a third axis, a ratio t2/t1 is 0.4 or more, where t2 is a thickness in the first axis direction of a portion where an inclination of a tangent line of an outer surface of the inner end portion to each main surface is 45°, and t1 is a maximum thickness in the first axis direction of the inner layer portion on each main surface.

18 Claims, 4 Drawing Sheets

(56) References Cited

U.S. PATENT DOCUMENTS

| | | | |
|---|---|---|---|
| 2023/0104406 A1* | 4/2023 | Numata | H01G 4/012 361/306.3 |
| 2023/0114467 A1* | 4/2023 | Kobayashi | H01G 4/30 361/301.4 |

* cited by examiner

CERAMIC ELECTRONIC COMPONENT AND CIRCUIT BOARD

CROSS-REFERENCE TO RELATED APPLICATIONS

This application claims the benefit of Japanese Application No. 2021-157393, filed Sep. 28, 2021, in the Japanese Patent Office. All disclosures of the document(s) named above are incorporated herein by reference.

BACKGROUND ART

The present disclosure relates to a ceramic electronic component including a pair of external electrodes and to a circuit board.

A multi-layer ceramic capacitor includes a ceramic body including a plurality of laminated internal electrodes, and a pair of external electrodes that cover the end portions of the ceramic body. The multi-layer ceramic capacitor is mounted by soldering its pair of external electrodes to a pair of terminals of a mounting substrate. The multi-layer ceramic capacitor is mounted by a reflow method, for example.

At the time of mounting of the multi-layer ceramic capacitor, solder wets and spreads antecedently on one of the pair of external electrodes, and thus the multi-layer ceramic capacitor rises up due to the surface tension of the solder acting on the one of the external electrodes in some cases (see, e.g., paragraph 0008 and FIG. 3 of Japanese Patent Application Laid-open No. 2000-49032). This phenomenon is called a tombstone phenomenon.

In this regard, the multi-layer ceramic capacitor described in Japanese Patent Application Laid-open No. 2000-49032 includes the external electrodes having the end surfaces configured to hardly swell outward, thus suppressing the occurrence of the tombstone phenomenon at the time of mounting. Specifically, in such a multi-layer ceramic capacitor, the end surfaces of the ceramic body are formed to be recessed, so that the end surfaces of the external electrodes are likely to be flattened.

SUMMARY OF THE INVENTION

In recent years, there has been a strong demand for a reduction in size and a reduction in height of passive components due to the shortage of a mounting space along with the densification or high integration of electronic circuits. In the multi-layer ceramic capacitor, the advance of a reduction in weight accompanied by the reduction in size and the reduction in height is likely to cause the tombstone phenomenon at the time of mounting, and thus the technology capable of suppressing the occurrence of a mounting failure is further expected.

In view of the circumstances as described above, it is desirable to provide a ceramic electronic component and a circuit board that are less likely to cause a mounting failure.

Additional or separate features and advantages of the disclosure will be set forth in the descriptions that follow and in part will be apparent from the description, or may be learned by practice of the disclosure. The objectives and other advantages of the disclosure will be realized and attained by the structure particularly pointed out in the written description and claims thereof as well as the appended drawings.

To achieve these and other advantages and in accordance with the purpose of the present disclosure, according to one embodiment of the present disclosure, there is provided a ceramic electronic component including: a ceramic body including first and second main surfaces perpendicular to a first axis, and first and second end surfaces perpendicular to a second axis orthogonal to the first axis, a first external electrode that covers the first end surface and extends from the first end surface to the first and second main surfaces; and a second external electrode that covers the second end surface and extends from the second end surface to the first and second main surfaces.

The first external electrode includes a first surface layer portion including a Sn plating layer, and a first inner layer portion including a Ni plating layer adjacent to the Sn plating layer and including a first rounded inner end portion on each of the first and second main surfaces.

The second external electrode includes a second surface layer portion including a Sn plating layer, and a second inner layer portion including a Ni plating layer adjacent to the Sn plating layer and including a second rounded inner end portion on each of the first and second main surfaces.

In a cross-section perpendicular to a third axis orthogonal to the first axis and the second axis at the center of the ceramic electronic component in a direction of the third axis, a ratio $t2/t1$ of a thickness $t2$ to a thickness $t1$ is 0.4 or more, where $t2$ is a thickness in a direction of the first axis of a portion in which an inclination of a tangent line of an outer surface of the first inner end portion and/or the second inner end portion with respect to each of the first and second main surfaces is 45°, and $t1$ is a maximum thickness in the direction of the first axis of the first inner layer portion and/or the second inner layer portion on each of the first and second main surfaces.

The present disclosure is based on the new findings in which a tombstone phenomenon is less likely to occur at the time of mounting of a ceramic electronic component in which the inclination of the outer surface of the Ni plating layer is steep in the inner end portion of the internal layer portion of the external electrode. In the configuration described above, the ratio $t2/t1$ of the thickness $t2$ to the thickness $t1$ is set to 0.4 or more, so that the configuration capable of sufficiently suppressing the occurrence of a tombstone phenomenon at the time of mounting of the ceramic electronic component is obtained.

The thickness $t2$ may be 3.5 μm or more.

The ceramic electronic component may have a size of 0.4±0.05 mm×0.2±0.05 mm×0.2±0.05 mm.

The ceramic electronic component may have a size of 0.2±0.015 mm×0.1±0.015 mm×0.1±0.015 mm.

Each of the first inner layer portion and the second inner layer portion may further include a Cu base layer adjacent to an inner side of the Ni plating layer.

Each of the first inner layer portion and the second inner layer portion may further include a Cu plating layer adjacent to an inner side of the Ni plating layer, and a Ni base layer adjacent to an inner side of the Cu plating layer.

The ratio $t2/t1$ may be 0.57 or less.

The ratio $t2/t1$ may be 0.46 or more and 0.51 or less.

According to one embodiment of the present disclosure, there is provided a circuit board including a ceramic electronic component and a mounting substrate.

The ceramic electronic component includes a ceramic body including first and second main surfaces perpendicular to a first axis and first and second end surfaces perpendicular to a second axis orthogonal to the first axis, a first external electrode that covers the first end surface and extends from the first end surface to the first and second main surfaces, and a second external electrode that covers the second end surface and extends from the second end surface to the first and second main surfaces.

The mounting substrate includes a substrate main body, a first terminal provided on the substrate main body, the first external electrode being soldered to the first terminal, and a second terminal provided on the substrate main body, the second external electrode being soldered to the second terminal.

The first external electrode includes a first inner layer portion including a Ni plating layer brought into contact with solder on the first terminal and including a first rounded inner end portion on each of the first and second main surfaces.

The second external electrode includes a second inner layer portion including a Ni plating layer brought into contact with solder on the second terminal and including a second rounded inner end portion on each of the first and second main surfaces.

In a cross-section perpendicular to a third axis orthogonal to the first axis and the second axis at the center of the ceramic electronic component in a direction of the third axis, a ratio t2/t1 of a thickness t2 to a thickness t1 is 0.4 or more, where t2 is a thickness in a direction of the first axis of a portion in which an inclination of a tangent line of an outer surface of the first inner end portion and/or the second inner end portion with respect to each of the first and second main surfaces is 45°, and t1 is a maximum thickness in the direction of the first axis of the first inner layer portion and/or the second inner layer portion on each of the first and second main surfaces.

According to the present disclosure, it is possible to provide a ceramic electronic component and a circuit board that are less likely to cause a mounting failure.

These and other objects, features and advantages of the present disclosure will become more apparent in light of the following detailed description of embodiments thereof, as illustrated in the accompanying drawings.

It is to be understood that both the foregoing general description and the following detailed description are exemplary and explanatory, and are intended to provide further explanation of the disclosure as claimed.

DETAILED DESCRIPTION OF THE EMBODIMENTS

Hereinafter, an embodiment of the present disclosure will be described with reference to the drawings.
The drawings show the X-axis, the Y-axis, and the Z-axis orthogonal to one another as appropriate. The X-axis, the Y-axis, and the Z-axis are common in all figures.

1. Overall Configuration of Multi-Layer Ceramic Capacitor 10

Figure 1:
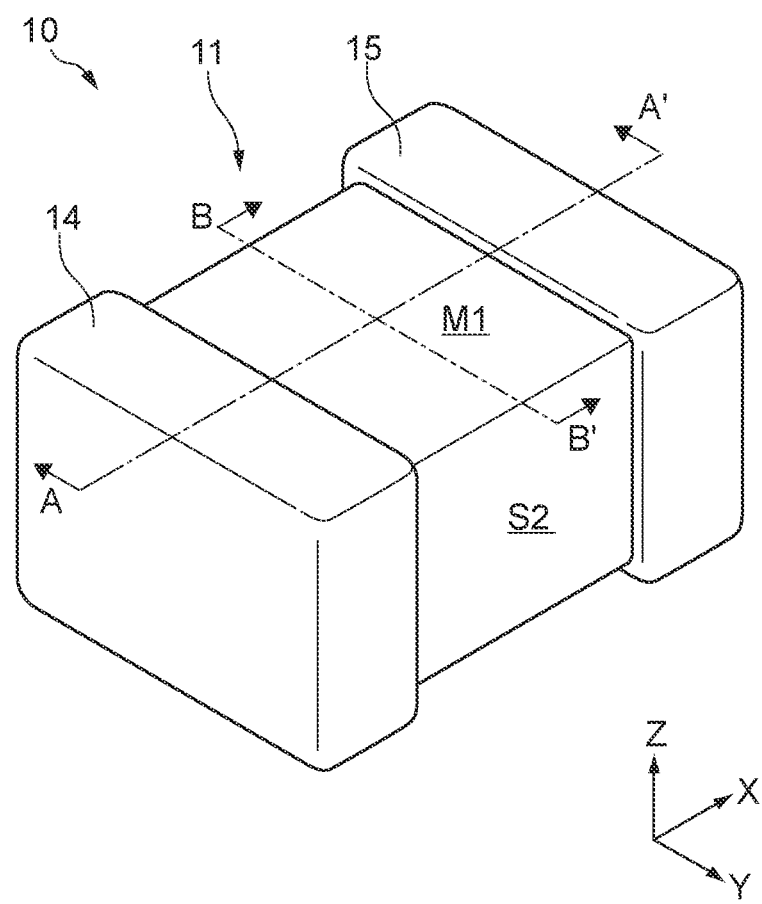
FIG. 1 is a perspective view of a multi-layer ceramic capacitor according to an embodiment of the present disclosure.
Figure 2:
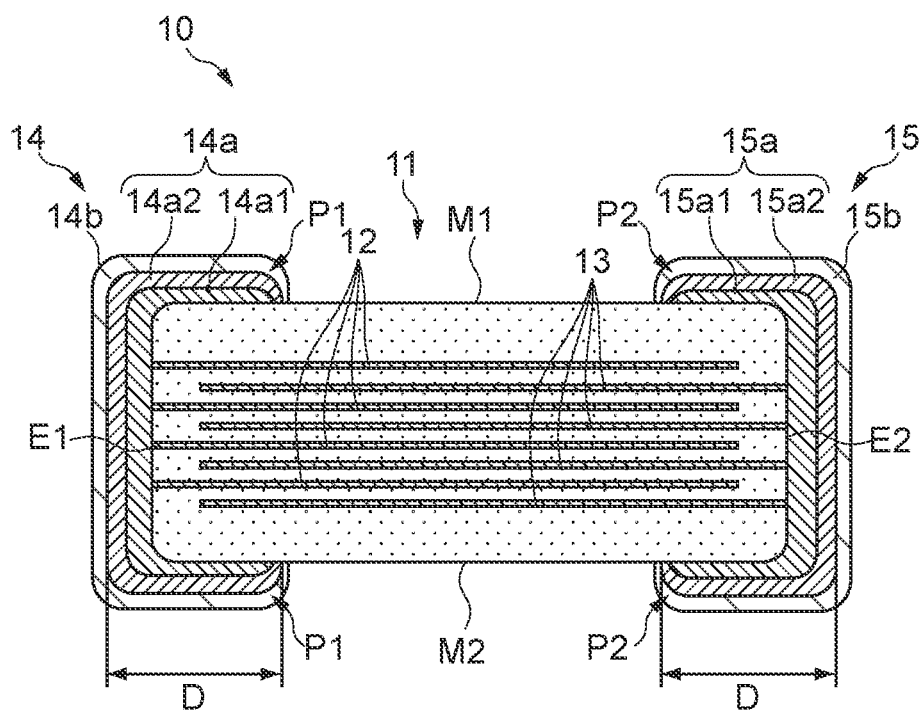
FIG. 2 is a cross-sectional view of the multi-layer ceramic capacitor taken along the A-A' line of FIG. 1.
Figure 3:
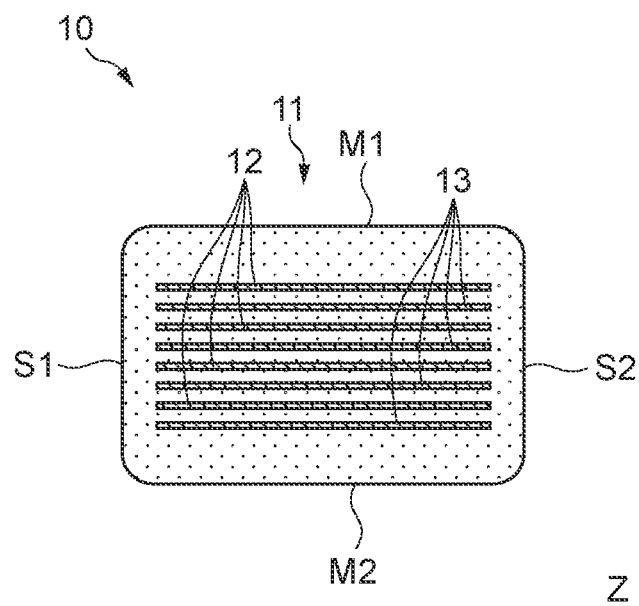
FIG. 3 is a cross-sectional view of the multi-layer ceramic capacitor taken along the B-B' line of FIG. 1.

FIGS. 1 to 3 each show a multi-layer ceramic capacitor 10 according to an embodiment of the present disclosure. FIG. 1 is a perspective view of the multi-layer ceramic capacitor 10. FIG. 2 is a cross-sectional view of the multi-layer ceramic capacitor 10 taken at the center in the Y-axis direction along the A-A' line of FIG. 1. FIG. 3 is a cross-sectional view of the multi-layer ceramic capacitor 10 taken at the center in the X-axis direction along the B-B' line of FIG. 1.

The multi-layer ceramic capacitor 10 includes a ceramic body 11, a first external electrode 14, and a second external electrode 15. The ceramic body 11 is configured as a main body of the multi-layer ceramic capacitor 10. The first and second external electrodes 14 and 15 constitute a pair of terminals for receiving electrical connection in the multi-layer ceramic capacitor 10.

The ceramic body 11 is formed as a hexahedron having the outer surface including first and second end surfaces E1 and E2 perpendicular to the X-axis, first and second side surfaces S1 and S2 perpendicular to the Y-axis, and first and second main surfaces M1 and M2 perpendicular to the Z-axis. The first and second end surfaces E1 and E2, the first and second side surfaces S1 and S2, and the first and second main surfaces M1 and M2 of the ceramic body 11 are each formed as a flat surface.

The flat surface according to this embodiment does not need to be strictly flat if the surface may be recognized as being flat when viewed as a whole. For example, the flat surface according to this embodiment also includes a surface having fine irregularities thereon, a surface having a gently curved shape in a predetermined range, and the like. The first and second end surfaces E1 and E2, the first and second side surfaces S1 and S2, and the first and second main surfaces M1 and M2 only need to be partially perpendicular to the X-axis, the Y-axis, and the Z-axis, respectively.

The first and second external electrodes 14 and 15 cover the first and second end surfaces E1 and E2 of the ceramic body 11, respectively, and face each other in the X-axis direction with the ceramic body 11 being interposed therebetween. The first and second external electrodes 14 and 15 extend from the first and second end surfaces E1 and E2 to the first and second main surfaces M1 and M2 and the first and second side surfaces S1 and S2 of the ceramic body 11 and are apart from each other in the X-axis direction on the first and second main surfaces M1 and M2 and the first and second side surfaces S1 and S2.

The ceramic body 11 is formed of dielectric ceramics. The ceramic body 11 includes a plurality of first internal electrodes 12 and a plurality of second internal electrodes 13 covered with dielectric ceramics. The first and second internal electrodes 12 and 13 each have a sheet-like shape extending along the X-Y plane and are alternately disposed along the Z-axis direction.

In other words, the ceramic body 11 includes an opposing region where the first and second internal electrodes 12 and 13 face each other in the Z-axis direction with ceramic layers being interposed therebetween. The first internal electrodes 12 are drawn from the opposing region to the first end surface E1 and connected to the first external electrode 14. The second internal electrodes 13 are drawn from the opposing region to the second end surface E2 and connected to the second external electrode 15.

With such a condiguration, when a voltage is applied between the first external electrode 14 and the second external electrode 15 in the multi-layer ceramic capacitor 10, the voltage is applied to the ceramic layers in the opposing region including the first and second internal electrodes 12 and 13. This allows the multi-layer ceramic capacitor 10 to store charge corresponding to the voltage applied between the first external electrode 14 and the second external electrode 15.

In the ceramic body 11, in order to increase the capacitances of the respective ceramic layers provided between the first and second internal electrodes 12 and 13, dielectric ceramics having a high dielectric constant is used. Examples of the dielectric ceramics having a high dielectric constant include a material having a perovskite structure containing barium (Ba) and titanium (Ti), which is typified by barium titanate ($BaTiO_3$).

Note that the dielectric ceramics may have a composition based on strontium titanate ($SrTiO_3$), calcium titanate ($CaTiO_3$), magnesium titanate ($MgTiO_3$), calcium zirconate ($CaZrO_3$), calcium zirconate titanate ($Ca(Zr, Ti)O_3$), barium zirconate ($BaZrO_3$), titanium oxide ($TiO_2$), barium strontium titanate, barium calcium titanate, barium zirconate, barium zirconate titanate, calcium zirconate titanate, barium calcium zirconate titanate ($Ba_{1-x-y}Ca_xTi_{1-z}Zr_zO_3$), or the like.

The first external electrode 14 includes a first inner layer portion 14a and a first surface layer portion 14b. The first inner layer portion 14a is provided adjacent to the ceramic body 11 and constitutes the inner portion of the first external electrode 14, which is covered with the first surface layer portion 14b. The first surface layer portion 14b is provided outside the first inner layer portion 14a and constitutes the outermost layer of the first external electrode 14.

The second external electrode 15 includes a second inner layer portion 15a and a second surface layer portion 15b. The second inner layer portion 15a is provided adjacent to the ceramic body 11 and constitutes the inner portion of the second external electrode 15, which is covered with the second surface layer portion 15b. The second surface layer portion 15b is provided outside the second inner layer portion 15a and constitutes the outermost layer of the second external electrode 15.

The first inner layer portion 14a includes a first base layer 14a1 and a first intermediate layer 14a2. The second inner layer portion 15a includes a second base layer 15a1 and a second intermediate layer 15a2. The first and second base layers 14a1 and 15a1 are configured as conductive sintered films, and the first and second intermediate layers 14a2 and 15a2 are configured as conductive plating films.

More specifically, the first and second base layers 14a1 and 15a1 are each configured as a Cu base layer that is a sintered film containing copper (Cu) or a Cu alloy as a main component. The first and second intermediate layers 14a2 and 15a2 are each configured as a Ni plating layer containing nickel (Ni) or a Ni alloy as a main component. Note that in this embodiment the main component means a component having the highest content ratio.

The first and second surface layer portions 14b and 15b are each configured as a Sn plating layer containing tin (Sn) or a Sn alloy as a main component. The Sn plating layer constituting each of the first and second surface layer portions 14b and 15b is melted together with solder at the time of mounting, so that the wettability of the solder with respect to the first and second external electrodes 14 and 15 is enhanced. Therefore, in the first and second external electrodes 14 and 15 after the mounting, the first and second intermediate layers 14a2 and 15a2 are in direct contact with the solder.

The first and second base layers 14a1 and 15a1 can be formed by baking an electrically conductive paste applied to the positions corresponding to the first and second external electrodes 14 and 15 on the outer surface of the ceramic body 11. Further, the first and second intermediate layers 14a2 and 15a2 and the first and second surface layer portions 14b and 15b can be formed by a wet plating method.

Note that the configuration of the first and second external electrodes 14 and 15 is not limited to the above configuration but can be variously modified in the range in which the effect of the present disclosure can be obtained. For example, the first and second base layers 14a1 and 15a1 are not limited to the Cu base layers, and may be, for example, Ni base layers containing nickel (Ni) or a Ni alloy as a main component, Ag base layers containing silver (Ag) or a Ag alloy as a main component, and the like.

Further, each of the first and second intermediate layers 14a2 and 15a2 may have a multi-layer structure including a Ni plating layer as the outermost layer, and may include, for example, a Cu plating layer containing copper (Cu) or a Cu alloy as a main component, which is adjacent to the inner side of the Ni plating layer. If the first and second intermediate layers 14a2 and 15a2 each include the Cu plating layer in such a manner, it is favorable that the first and second base layers 14a1 and 15a1 are each a Ni base layer.

The multi-layer ceramic capacitor 10 can effectively suppress the occurrence of a mounting failure due to the tombstone phenomenon by the action of the shape of the first and second inner layer portions 14a and 15a. In particular, the multi-layer ceramic capacitor 10 can more effectively suppress the occurrence of a mounting failure even in a small, lightweight configuration in which the tombstone phenomenon is more likely to occur at the time of mounting.

Specifically, in the multi-layer ceramic capacitor 10, the effect of suppressing the occurrence of a mounting failure is more effectively obtained in the size equal to or smaller than 0.4±0.05 mm×0.2±0.05 mm×0.2±0.05 mm. In other words, in the multi-layer ceramic capacitor 10, it is favorable that the dimension in the X-axis direction is 0.4 mm or less, and the dimensions in the Y-axis and Z-axis directions are each 0.2 mm or less.

The size of the multi-layer ceramic capacitor 10 can be set to, for example, 0.4±0.05 mm×0.2±0.05 mm×0.2±0.05 mm, 0.2±0.015 mm×0.1±0.015 mm×0.1±0.015 mm, or the like. Note that the multi-layer ceramic capacitor 10 is not limited to those sizes, and can have various sizes corresponding to the applications thereof.

2. First and Second Inner Layer Portions 14a and 15a

As shown in FIG. 2, the first and second inner layer portions 14a and 15a of the first and second external electrodes 14 and 15 include first and second inner end portions P1 and P2, respectively, which are end portions facing inward in the X-axis direction and located on the first and second main surfaces M1 and M2. The first and second inner end portions P1 and P2 of the first and second inner layer portions 14a and 15a extend along the Y-axis direction on the first and second main surfaces M1 and M2 and are covered with the first and second surface layer portions 14b and 15b, respectively.

The first and second inner end portions P1 and P2 of the first and second inner layer portions 14a and 15a have a rounded shape and a thickness decreasing inward in the X-axis direction. In other words, in the first and second inner end portions P1 and P2, the outer surfaces of the first and second inner layer portions 14a and 15a, which are surfaces of the first and second intermediate layer 14a2 and 15a2 adjacent to the first and second surface layer portions 14b and 15b, are inclined so as to approach the first and second main surfaces M1 and M2 inward in the X-axis direction.

Figure 4:
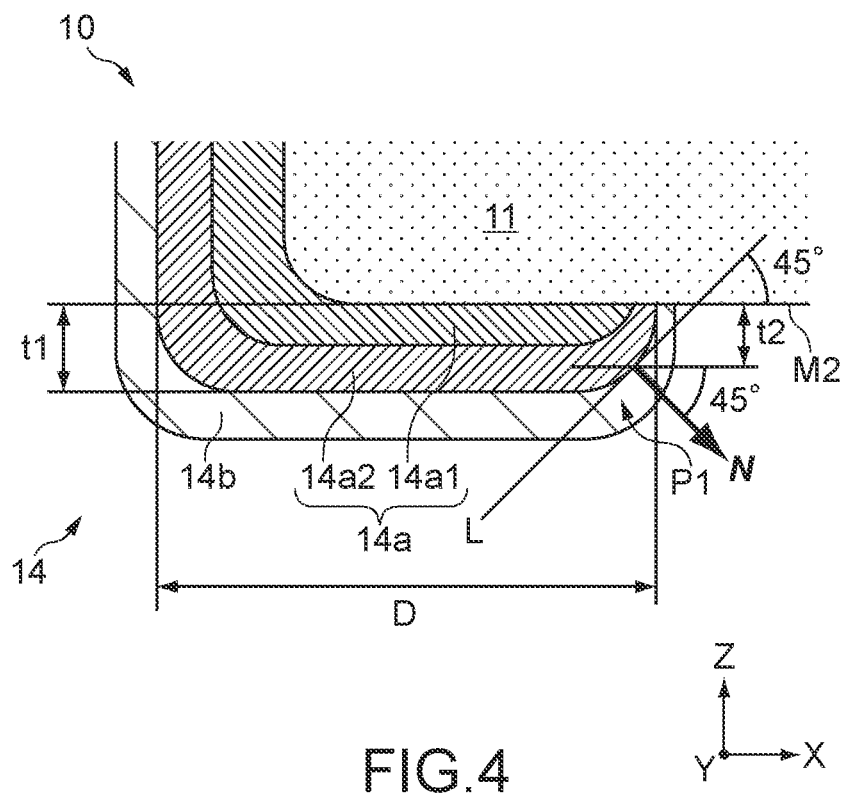
FIG. 4 is a partial cross-sectional view of the multi-layer ceramic capacitor.

FIG. 4 is a partial cross-sectional view showing the vicinity of the first and second inner end portions P1 and P2 in FIG. 2 in an enlarged manner. FIG. 4 shows the first inner end portion P1 of the first inner layer portion 14a on the second main surface M2, but the first inner end portion P1 of the first inner layer portion 14a on the first main surface M1, and the second inner end portions P2 of the second inner layer portion 15a on the first and second main surfaces M1 and M2 are also configured similarly to the first inner end portion P1 shown in FIG. 4.

FIG. 4 shows a thickness t1 of the first inner layer portion 14a. The thickness t1 indicates a maximum thickness of the first and second inner layer portions 14a and 15a in the Z-axis direction on the first and second main surfaces M1 and M2 in the cross-section shown in FIGS. 2 and 4. In other words, the thickness t1 corresponds to the maximum value of the distance in the Z-axis direction of the outer surface of the first and second inner layer portions 14a and 15a from the first and second main surfaces M1 and M2 in the cross-section shown in FIGS. 2 and 4.

Further, FIG. 4 shows a thickness t2 of the first inner layer portion 14a. The thickness t2 indicates a thickness in the Z-axis direction of a portion, in which the tangent line L of the outer surface of the first and second inner end portions P1 and P2 of the first and second inner layer portions 14a and 15a with respect to the first and second main surfaces M1 and M2 has an inclination of 45°, that is, a portion in which the outward normal vector N in the Z-axis direction on the outer surface has an inclination of 45°, in the cross-section shown in FIGS. 2 and 4.

In the first and second inner end portions P1 and P2 of the first and second inner layer portions 14a and 15a, the ratio t2/t1 of the thickness t2 to the thickness t1 is set to 0.4 or more such that the portion in which the inclination of the tangent line L of the outer surface with respect to the first and second main surfaces M1 and M2 is 45° is located outward in the Z-axis direction. Thus, the inclination with respect to the first and second main surfaces M1 and M2 is steep on the outer surface of the first and second inner end portions P1 and P2 of the first and second inner layer portions 14a and 15a.

In other words, if the ratio t2/t1 of the thickness t2 to the thickness t1 is set to 0.4 or more, the outer surface of the first and second inner end portions P1 and P2 of the first and second inner layer portions 14a and 15a largely stands up outward in the Z-axis direction from the connection portion with the first and second main surfaces M1 and M2 toward the outside in the X-axis direction, thus providing the shape in which the first and second inner end portions P1 and P2 of the first and second inner layer portions 14a and 15a largely protrude obliquely inward in the X-axis direction toward the outside in the Z-axis direction. Further, the ratio t2/t1 of the thickness t2 to the thickness t1 is favorably 0.57 or less, and more favorably 0.46 or more and 0.51 or less.

The shape of the first and second inner end portions P1 and P2 of the first and second inner layer portions 14a and 15a can be controlled by the condition of wet plating for forming the first and second intermediate layers 14a2 and 15a2, the viscosity of an electrically conductive paste used when the first and second base layers 14a1 and 15a1 are to be formed, and the like. Specifically, in the first and second intermediate layers 14a2 and 15a2, a current density in wet plating is increased, so that the shape in which the first and second inner end portions P1 and P2 largely protrude is likely to be obtained.

Figure 5:
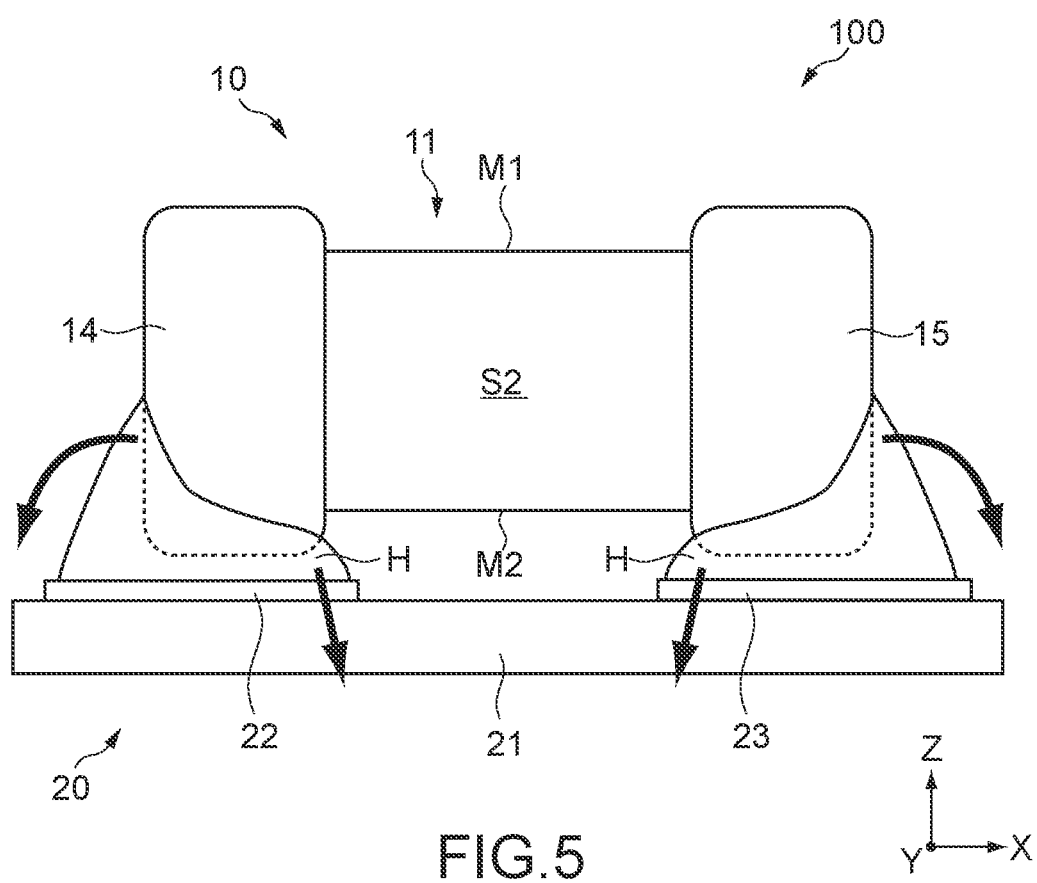
FIG. 5 is a side view of a circuit board on which the multi-layer ceramic capacitor is mounted.

FIG. 5 is a side view of a circuit board 100 on which the multi-layer ceramic capacitor 10 is mounted. The circuit board 100 includes a mounting substrate 20 including a substrate main body 21, a first terminal 22, and a second terminal 23. The first and second terminals 22 and 23 constitute a pair of terminals of the mounting substrate 20 and are provided on the mounting surface of the substrate main body 21, the mounting surface facing upward in the Z-axis direction.

In the circuit board 100, the first and second external electrodes 14 and 15 of the multi-layer ceramic capacitor 10 are soldered to the first and second terminals 22 and 23 of the mounting substrate 20, respectively. With this configuration, in the circuit board 100, the multi-layer ceramic capacitor 10 is electrically connected to the mounting substrate 20 and also physically fixed thereto.

The multi-layer ceramic capacitor 10 is mounted onto the mounting substrate 20 by using a general reflow method. In the reflow method, in the state where the first and second external electrodes 14 and 15 of the multi-layer ceramic capacitor 10 are placed on the first and second terminals 22 and 23 of the mounting substrate 20, on each of which solder H is disposed, the solder H is melted in the process of passing the multi-layer ceramic capacitor 10 in the above state through a reflow furnace and then solidified.

In the multi-layer ceramic capacitor 10, in the above process, the Sn plating layers constituting the first and second surface layer portions 14b and 15b are melted together with the solder H. Therefore, in the circuit board 100, the first and second surface layer portions 14b and 15b are removed from the portions of the first and second external electrodes 14 and 15, the portions being in contact with the solder H, and the outer surfaces of the first and second inner layer portions 14a and 15a are brought into direct contact with the solder H.

In the multi-layer ceramic capacitor 10, the outer surfaces of the first and second inner end portions P1 and P2 of the first and second inner layer portions 14a and 15a largely protrude, so that the occurrence of a tombstone phenomenon, in which the multi-layer ceramic capacitor 10 rises up on one of the first and second terminals 22 and 23 due to the action of the surface tension of the molten solder H, can be suppressed.

Hereinafter, such an effect will be described later in detail.

Figure 6:
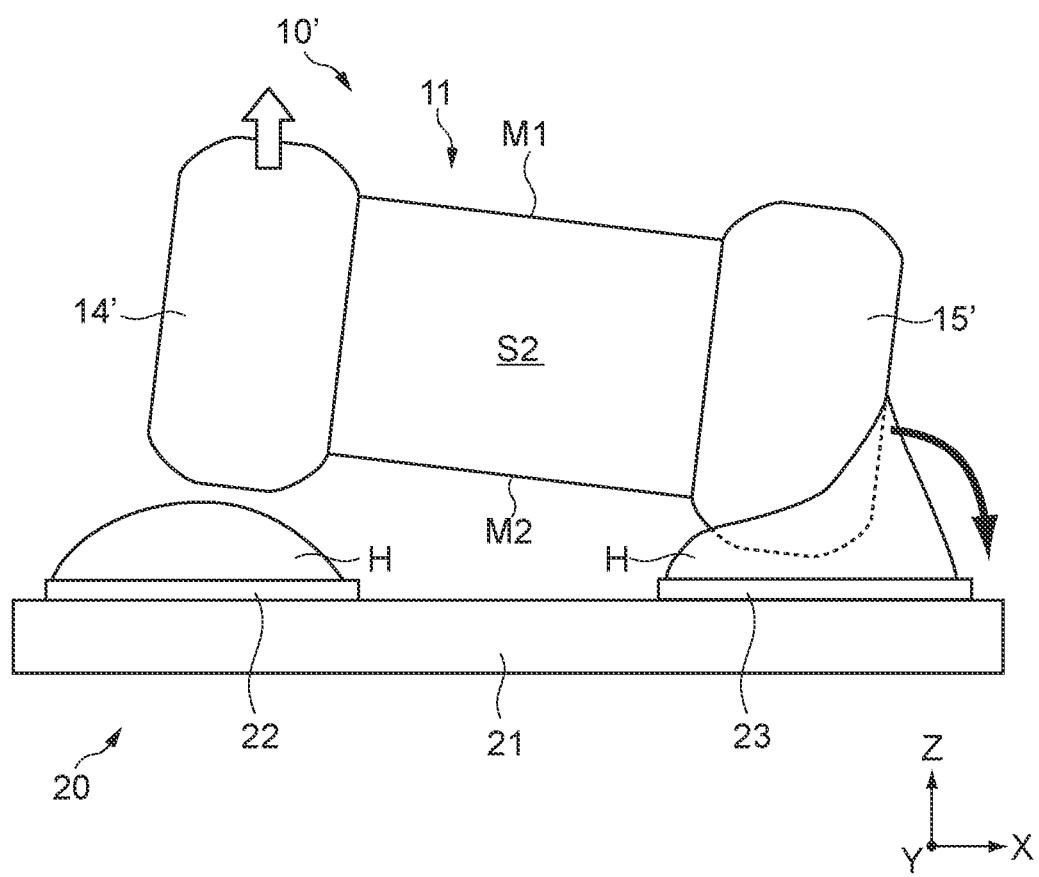
FIG. 6 is a side view showing the process of mounting the multi-layer ceramic capacitor in a comparative example.

FIG. 6 is a side view showing the process of mounting a multi-layer ceramic capacitor 10' according to a comparative example of this embodiment. The multi-layer ceramic capacitor 10' according to the comparative example is different from this embodiment in that the ratio t2/t1 of the thickness t2 to the thickness t1 is less than 0.4 and that first and second external electrodes 14' and 15' include inner end portions gently inclined.

The multi-layer ceramic capacitor 10' shown in FIG. 6 rises up on the second terminal 23 of the mounting substrate 20, that is, the tombstone phenomenon is found. The tombstone phenomenon arises from the moment, which is generated in the direction indicated by the arrow in FIG. 6, due to the action of the surface tension of the solder H that has wetted and spread on the second external electrode 15' before the first external electrode 14'.

In the multi-layer ceramic capacitor 10' shown in FIG. 6, the first external electrode 14' floats from the first terminal 22 of the mounting substrate 20 due to the occurrence of the tombstone phenomenon, and thus electrical conduction of the first external electrode 14' to the first terminal 22 of the mounting substrate 20 is not obtained. Therefore, the multi-layer ceramic capacitor 10' shown in FIG. 6 causes a mounting failure.

Further, in the multi-layer ceramic capacitor 10', the tombstone phenomenon in which the multi-layer ceramic capacitor 10' rises up on the first terminal 22 of the mounting substrate 20 also occurs when the solder H wets and spreads on the first external electrode 14' prior to the second external electrode 15'. As described above, in the multi-layer ceramic capacitor 10' according to the comparative example, a mounting failure due to the tombstone phenomenon is likely to occur.

In contrast to this, in the multi-layer ceramic capacitor 10 according to this embodiment, the surface tension of the solder H acts on the largely-protruding outer surfaces of the first and second inner end portions P1 and P2 of the first and second inner layer portions 14a and 15a so as to inhibit the multi-layer ceramic capacitor 10 from rising up on the first and second terminals 22 and 23 of the mounting substrate 20. This makes it possible to suppress the occurrence of the tombstone phenomenon in the multi-layer ceramic capacitor 10.

In other words, in the first external electrode 14, the surface tension of the solder H acts on the outer surface of the first inner end portion P1 of the first inner layer portion 14a in the opposite direction of the force to cause the multi-layer ceramic capacitor 10 to rise up on the first terminal 22. Thus, the multi-layer ceramic capacitor 10 is less likely to rise up on the first terminal 22.

Further, in the second external electrode 15, the surface tension of the solder H acts on the outer surface of the second inner end portion P2 of the second inner layer portion 15a in the opposite direction of the force to cause the multi-layer ceramic capacitor 10 to rise up on the second terminal 23. Thus, the multi-layer ceramic capacitor 10 is less likely to rise up on the second terminal 23.

Thus, in the multi-layer ceramic capacitor 10, the tombstone phenomenon is less likely to occur even when the solder H wets and spreads antecedently on one of the first and second external electrodes 14 and 15, and the multi-layer ceramic capacitor 10 is likely to maintain a normal posture on the mounting substrate 20 in the process of mounting. Therefore, the multi-layer ceramic capacitor 10 can suppress the occurrence of a mounting failure.

Further, in the first and second inner layer portions 14a and 15a of the first and second external electrodes 14 and 15, it is favorable that the thickness t2 is set to 3.5 μm or more regardless of the size of the thickness t1. This makes it possible to more reliably obtain the action of inhibiting the multi-layer ceramic capacitor 10 from rising up on the first and second terminals 22 and 23 of the mounting substrate 20 due to the surface tension of the solder H.

In addition, in the first and second inner layer portions 14a and 15a, it is favorable that the thickness t2 (μm) corresponding to the weight W (mg) of the multi-layer ceramic capacitor 10 is ensured. Specifically, the ratio t2/W of the thickness t2 (μm) to the weight W (mg) is favorably 35 or more. This makes it possible to more reliably obtain the above effect in the multi-layer ceramic capacitor 10. Further, if the size of the multi-layer ceramic capacitor 10 is 0.4±0.05 mm×0.2±0.05 mm×0.2±0.05 mm, it is more favorable that the ratio t2/W is 58 or less. Furthermore, if the size of the multi-layer ceramic capacitor 10 is 0.2±0.015 mm×0.1±0.015 mm×0.1±0.015 mm, it is more favorable that the ratio t2/W is 180 or more and 230 or less, and it is even more favorable that the ratio t2/W is 190 or more and 210 or less.

Additionally, in the multi-layer ceramic capacitor 10, if the outer surfaces of the first and second inner end portions P1 and P2 of the first and second inner layer portions 14a and 15a go around outward in the X-axis direction at the connection portions with the first and second main surfaces M1 and M2 and form wedge-shaped spaces with the first and second main surfaces M1 and M2, the solder is less likely to enter the wedge-shaped spaces at the time of mounting. Thus, voids of the solder are likely to be generated.

In this regard, in the cross-section shown in FIGS. 2 and 4, it is favorable that the inclination of the tangent line of the connection portion on the outer surfaces of the first and second inner end portions P1 and P2 of the first and second inner layer portions 14a and 15a with respect to the first and second main surfaces M1 and M2 is 90° or less. In other words, it is favorable that the normal vector N of the connection portion on the outer surface of the first and second inner end portions P1 and P2 of the first and second inner layer portions 14a and 15a with respect to the first and second main surfaces M1 and M2 is not directed inward in the Z-axis direction.

3. Examples and Comparative Examples

For Examples 1 to 20 and Comparative examples 1 to 19 of the embodiment described above, samples of the multi-layer ceramic capacitor were produced, in which the thicknesses t1 and t2 and the weight W were variously changed. In Examples 1 to 10 and Comparative examples 1 to 18, the size of the sample was set to the 0402 size of (0.4±0.05 mm×0.2±0.05 mm×0.2±0.05 mm). In Examples 11 to 20 and Comparative example 19, the size of the sample was set to the 0201 size of (0.2±0.015 mm×0.1±0.015 mm×0.1±0.015 mm). Note that in the sample with the 0402 size, the dimension of the ceramic body 11 in the X-axis direction was set to 0.365 mm, and the dimension of the ceramic body 11 in the Z-axis direction was set to 0.185 mm. Further, in the sample with the 0201 size, the dimension of the ceramic body 11 in the X-axis direction was set to 0.185 mm, and the dimension of the ceramic body 11 in the Z-axis direction was set to 0.080 mm. Further, the dimension D of the first and second inner layer portions 14a and 15a in the X-axis direction shown in FIGS. 2 and 4 in the first and second external electrodes 14 and 15 was set to 95 μm in the sample with the 0402 size, and set to 70 μm in the sample with the 0201 size.

Further, the presence or absence of the occurrence of a mounting failure was evaluated for each sample by mounting the sample onto the mounting substrate 20 by a reflow method. For the configuration of each of Examples and Comparative examples, 1000 samples were evaluated. The configuration in which there were no samples having a mounting failure was regarded as pass, and the configuration in which there were one or more samples having a mounting failure was regarded as fail. Note that the thicknesses t1 and t2 and the weight W in each configuration of Examples 1 to 20 and Comparative examples 1 to 19 were each a mean value of the values obtained by sampling ten samples in each configuration and measuring them. Table 1 shows the results of Examples 1 to 10 and Comparative example 1 to 18 in which the samples having the 0402 size were used. Table 2 shows the results of Examples 11 to 20 and Comparative example 19 in which the samples having the 0201 size were used.

TABLE 1

|  | t1 (μm) | t2 (μm) | W (mg) | t2/t1 | t2/W | Evaluation |
|---|---|---|---|---|---|---|
| Example 1 | 9.7 | 5.0 | 0.094 | 0.52 | 54 | Pass |
| Example 2 | 9.2 | 5.3 | 0.094 | 0.57 | 56 | Pass |
| Example 3 | 9.1 | 5.2 | 0.094 | 0.57 | 55 | Pass |
| Example 4 | 9.5 | 5.4 | 0.094 | 0.57 | 58 | Pass |
| Example 5 | 8.5 | 4.9 | 0.094 | 0.57 | 52 | Pass |
| Example 6 | 9.0 | 4.0 | 0.107 | 0.44 | 37 | Pass |
| Example 7 | 9.1 | 4.1 | 0.107 | 0.45 | 38 | Pass |
| Example 8 | 10.0 | 4.5 | 0.107 | 0.45 | 42 | Pass |
| Example 9 | 9.7 | 3.9 | 0.107 | 0.40 | 36 | Pass |
| Example 10 | 8.7 | 3.9 | 0.107 | 0.44 | 36 | Pass |
| Comparative example 1 | 9.8 | 3.2 | 0.100 | 0.33 | 32 | Fail |
| Comparative example 2 | 10.1 | 3.6 | 0.100 | 0.36 | 36 | Fail |
| Comparative example 3 | 9.5 | 3.5 | 0.100 | 0.36 | 34 | Fail |
| Comparative example 4 | 9.7 | 3.5 | 0.100 | 0.36 | 35 | Fail |
| Comparative example 5 | 11.0 | 2.3 | 0.107 | 0.20 | 21 | Fail |
| Comparative example 6 | 11.4 | 3.1 | 0.107 | 0.27 | 28 | Fail |
| Comparative example 7 | 11.9 | 3.9 | 0.107 | 0.32 | 36 | Fail |
| Comparative example 8 | 9.9 | 2.7 | 0.107 | 0.27 | 25 | Fail |
| Comparative example 9 | 10.4 | 3.0 | 0.107 | 0.29 | 28 | Fail |
| Comparative example 10 | 9.7 | 3.4 | 0.110 | 0.35 | 31 | Fail |
| Comparative example 11 | 9.0 | 2.5 | 0.110 | 0.28 | 23 | Fail |
| Comparative example 12 | 9.9 | 2.7 | 0.110 | 0.28 | 25 | Fail |
| Comparative example 13 | 8.8 | 3.1 | 0.110 | 0.35 | 28 | Fail |
| Comparative example 14 | 6.6 | 2.2 | 0.115 | 0.33 | 19 | Fail |
| Comparative example 15 | 7.6 | 2.3 | 0.115 | 0.30 | 20 | Fail |
| Comparative example 16 | 5.2 | 1.7 | 0.115 | 0.32 | 14 | Fail |
| Comparative example 17 | 7.6 | 2.1 | 0.115 | 0.28 | 19 | Fail |
| Comparative example 18 | 6.5 | 2.1 | 0.115 | 0.32 | 18 | Fail |

TABLE 2

|  | t1 (μm) | t2 (μm) | W (mg) | t2/t1 | t2/W | Evaluation |
|---|---|---|---|---|---|---|
| Example 11 | 9.5 | 5.2 | 0.023 | 0.55 | 224 | Pass |
| Example 12 | 8.8 | 4.9 | 0.023 | 0.56 | 212 | Pass |
| Example 13 | 10.1 | 5.0 | 0.023 | 0.49 | 214 | Pass |
| Example 14 | 8.7 | 4.0 | 0.023 | 0.46 | 173 | Pass |
| Example 15 | 9.0 | 4.6 | 0.023 | 0.51 | 197 | Pass |
| Example 16 | 9.9 | 4.8 | 0.025 | 0.48 | 193 | Pass |
| Example 17 | 9.6 | 4.7 | 0.025 | 0.49 | 189 | Pass |
| Example 18 | 9.4 | 4.5 | 0.025 | 0.48 | 184 | Pass |
| Example 19 | 8.9 | 4.8 | 0.025 | 0.54 | 194 | Pass |
| Example 20 | 10.0 | 5.4 | 0.025 | 0.54 | 218 | Pass |
| Comparative example 19 | 6.5 | 1.8 | 0.026 | 0.28 | 71 | Fail |

As shown in Tables 1 and 2, Examples 1 to 20 in which the ratio t2/t1 of the thickness t2 to the thickness t1 is 0.4 or more did not have the samples having a mounting failure and were evaluated as pass. Note that the maximum value of the ratio t2/t1 in Examples 1 to 20 was 0.57. On the other hand, Comparative examples 1 to 19 in which the ratio t2/t1 of the thickness t2 to the thickness t1 is less than 0.4 had the samples having a mounting failure resulting mainly from the tombstone phenomenon and were evaluated as fail.

4. Other Embodiments

While the embodiment of the present disclosure has been described, the present disclosure is not limited to the embodiment described above, and it should be appreciated that the present disclosure may be variously modified.

For example, the multi-layer ceramic capacitor 10 does not need to have the above-mentioned configuration of the first and second inner end portions P1 and P2 of the first and second inner layer portions 14a and 15a on both the first and second main surfaces M1 and M2. For example, the first and second inner end portions P1 and P2 of the first and second inner layer portions 14a and 15a need not have the above configuration on one of the first and second main surfaces M1 and M2, which does not face the mounting substrate 20 at the time of mounting.

Further, the first and second base layers 14a1 and 15a1 of the first and second external electrodes 14 and 15 need not be the sintered films, and for example, may be sputtering films formed by sputtering. In this case as well, in the multi-layer ceramic capacitor 10, the outer surfaces of the first and second intermediate layers 14a2 and 15a2 are formed into the shape as described above, so that the effect of suppressing the occurrence of the tombstone phenomenon is obtained.

Additionally, the present disclosure is applicable not only to the multi-layer ceramic capacitor, but also to general ceramic electronic components each configured to include a pair of external electrodes. Examples of such ceramic electronic components to which the present disclosure is applicable include a chip varistor, a chip thermistor, and a multi-layer inductor, in addition to the multi-layer ceramic capacitor.

It will be apparent to those skilled in the art that various modifications and variations can be made in the present disclosure without departing from the spirit or scope of the disclosure. Thus, it is intended that the present disclosure cover modifications and variations that come within the scope of the appended claims and their equivalents. In particular, it is explicitly contemplated that any part or whole of any two or more of the embodiments and their modifications described above can be combined and regarded within the scope of the present disclosure.

What is claimed is:

1. A ceramic electronic component, comprising:
   a ceramic body including
   first and second main surfaces perpendicular to a first axis, and
   first and second end surfaces perpendicular to a second axis orthogonal to the first axis;
   a first external electrode that covers the first end surface and extends from the first end surface to the first and second main surfaces; and
   a second external electrode that covers the second end surface and extends from the second end surface to the first and second main surfaces, wherein
   the first external electrode includes
   a first surface layer portion including a Sn plating layer, and
   a first inner layer portion including a Ni plating layer adjacent to the Sn plating layer and including a first rounded inner end portion on each of the first and second main surfaces,
   the second external electrode includes
   a second surface layer portion including a Sn plating layer, and
   a second inner layer portion including a Ni plating layer adjacent to the Sn plating layer and including a second rounded inner end portion on each of the first and second main surfaces, and
   in a cross-section perpendicular to a third axis orthogonal to the first axis and the second axis at the center of the ceramic electronic component in a direction of the third axis, a ratio t2/t1 of a thickness t2 to a thickness t1 is 0.4 or more, where t2 is a thickness in a direction of the first axis of a portion in which an inclination of a tangent line of an outer surface of the first inner end portion and/or the second inner end portion with respect to each of the first and second main surfaces is 45°, and t1 is a maximum thickness in the direction of the first axis of the first inner layer portion and/or the second inner layer portion on each of the first and second main surfaces.

2. The ceramic electronic component according to claim 1, wherein
the thickness t2 is 3.5 µm or more.

3. The ceramic electronic component according to claim 1, which has a size of 0.4±0.05 mm×0.2±0.05 mm×0.2±0.05 mm.

4. The ceramic electronic component according to claim 1, which has a size of 0.2±0.015 mm×0.1±0.015 mm×0.1±0.015 mm.

5. The ceramic electronic component according to claim 1, wherein
each of the first inner layer portion and the second inner layer portion further includes a Cu base layer adjacent to an inner side of the Ni plating layer.

6. The ceramic electronic component according to claim 1, wherein
each of the first inner layer portion and the second inner layer portion further includes a Cu plating layer adjacent to an inner side of the Ni plating layer, and a Ni base layer adjacent to an inner side of the Cu plating layer.

7. The ceramic electronic component according to claim 1, wherein
the ratio t2/t1 is 0.57 or less.

8. The ceramic electronic component according to claim 1, wherein
the ratio t2/t1 is 0.46 or more and 0.51 or less.

9. A circuit board, comprising:
a ceramic electronic component; and
a mounting substrate,
the ceramic electronic component including
a ceramic body including
first and second main surfaces perpendicular to a first axis, and
first and second end surfaces perpendicular to a second axis orthogonal to the first axis,
a first external electrode that covers the first end surface and extends from the first end surface to the first and second main surfaces, and
a second external electrode that covers the second end surface and extends from the second end surface to the first and second main surfaces,
the mounting substrate including
a substrate main body,
a first terminal provided on the substrate main body, the first external electrode being soldered to the first terminal, and
a second terminal provided on the substrate main body, the second external electrode being soldered to the second terminal, wherein
the first external electrode includes a first inner layer portion including a Ni plating layer brought into contact with solder on the first terminal and including a first rounded inner end portion on each of the first and second main surfaces,
the second external electrode includes a second inner layer portion including a Ni plating layer brought into contact with solder on the second terminal and including a second rounded inner end portion on each of the first and second main surfaces, and
in a cross-section perpendicular to a third axis orthogonal to the first axis and the second axis at the center of the ceramic electronic component in a direction of the third axis, a ratio t2/t1 of a thickness t2 to a thickness t1 is 0.4 or more, where t2 is a thickness in a direction of the first axis of a portion in which an inclination of a tangent line of an outer surface of the first inner end portion and/or the second inner end portion with respect to each of the first and second main surfaces is 45°, and t1 is a maximum thickness in the direction of the first axis of the first inner layer portion and/or the second inner layer portion on each of the first and second main surfaces.

10. A ceramic electronic component, comprising:
a ceramic body including
first and second main surfaces perpendicular to a first axis, and
first and second end surfaces perpendicular to a second axis orthogonal to the first axis;
a first external electrode that covers the first end surface and extends from the first end surface to the first and second main surfaces, and
a second external electrode that covers the second end surface and extends from the second end surface to the first and second main surfaces, wherein
the first external electrode includes
a first surface layer portion including a Sn plating layer, and
a first inner layer portion including a Ni plating layer adjacent to the Sn plating layer and including a first rounded inner end portion on each of the first and second main surfaces,
the second external electrode includes
a second surface layer portion including a Sn plating layer, and
a second inner layer portion including a Ni plating layer adjacent to the Sn plating layer and including a second rounded inner end portion on each of the first and second main surfaces, and
in a cross-section perpendicular to a third axis orthogonal to the first axis and the second axis at the center of the ceramic electronic component in a direction of the third axis, a ratio t2/W of a thickness t2 (µm) to a weight W (mg) is 35 or more, where t2 is a thickness in a direction of the first axis of a portion in which an inclination of a tangent line of an outer surface of the first inner end portion and/or the second inner end portion with respect to each of the first and second main surfaces is 45°, and W is a weight of the ceramic electronic component.

11. The ceramic electronic component according to claim 10, wherein
the thickness t2 is 3.5 µm or more.

12. The ceramic electronic component according to claim 10, which has a size of 0.4±0.05 mm×0.2±0.05 mm×0.2±0.05 mm.

13. The ceramic electronic component according to claim 10, which has a size of 0.2±0.015 mm×0.1±0.015 mm×0.1±0.015 mm.

14. The ceramic electronic component according to claim 10, wherein
each of the first inner layer portion and the second inner layer portion further includes a Cu base layer adjacent to an inner side of the Ni plating layer.

15. The ceramic electronic component according to claim 10, wherein
each of the first inner layer portion and the second inner layer portion further includes a Cu plating layer adjacent to an inner side of the Ni plating layer, and a Ni base layer adjacent to an inner side of the Cu plating layer.

16. The ceramic electronic component according to claim 12, wherein
the ratio t2/W is 58 or less.

17. The ceramic electronic component according to claim 13, wherein
the ratio t2/W is 180 or more and 230 or less.

18. The ceramic electronic component according to claim 13, wherein
the ratio t2/W is 190 or more and 210 or less.

* * * * *